May 4, 1926.  
H. W. INGLE  
1,583,046  
LEER FOR ANNEALING GLASSWARE  
Filed March 31, 1925  3 Sheets-Sheet 1

Inventor  
Henry W. Ingle,  
by Robert S. Brown  
Attorney.

Inventor
Henry W. Ingle
by Robert S. Brown
Attorney.

Patented May 4, 1926.

1,583,046

UNITED STATES PATENT OFFICE.

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE.

LEER FOR ANNEALING GLASSWARE.

Application filed March 31, 1925. Serial No. 19,613.

*To all whom it may concern:*

Be it known that I, HENRY W. INGLE, a citizen of the United States, residing at Hartford, in the county of Hartford and State of Connecticut, have invented certain new and useful Improvements in Leers for Annealing Glassware, of which the following is a specification.

The invention relates to leers for annealing glassware, and it has particular relation to leers of the type in which the ware is transported through a tunnel by an endless conveyor and is subjected therein to varying temperature-environments.

Heretofore, the conveyors employed in leers of the type mentioned have generally embodied a plurality of slats or pans of solid unyieldable metallic construction. By reason of the large amount of metal contained in a conveyor of this type, its heat capacity is very great therefore, such a conveyor not only requires large fuel consumption in applying sufficient heat to the conveyor at the receiving end of the tunnel, to bring it up to a temperature where it will not check the ware when deposited thereon, but the conveyor gives up its heat so slowly during the cooling stages that a large quantity of heat is carried for a considerable distance through the tunnel, which interferes materially with the regulation of the temperature environment therein. Moreover, conveyors of this type are subject to considerable warping when exposed to continued changes in temperature, which distorts the ware-supporting surface of the conveyor to such an extent that ware cannot be easily placed thereon in an upright position and it frequently falls over and breaks during its passage through the tunnel.

The general object of the present invention is to overcome the difficulties hereinabove mentioned and to improve upon the efficiency of glass-annealing leers with respect to the conveyor which transports the ware through the leer tunnel.

More specifically, the object of the invention to provide a leer of the tunnel type equipped with an endless conveyor belt of low heat-capacity and preferably of openwork structure, such as of woven wire fabric, to facilitate the exchange of heat between the conveyor and its environment and also between the ware and its environment, thereby not only reducing the amount of fuel consumed in bringing the conveyor up to the proper operating temperature, but minimizing the difficulties encountered in securing a proper temperature gradient in the tunnel.

In carrying out the foregoing objects, I provide a leer having a floor of flat metallic construction, which may constitute the upper wall of a flue which extends beneath the entire length of the tunnel and through which products of combustion of controllable temperature are caused to flow, as disclosed in U. S. Patents No. 1,560,481 and No. 1,571,-137, granted November 3, 1925, and January 26, 1926, respectively, to Hartford-Empire Company as the assignee of Vergil Mulholland. The leer is equipped with an endless conveyor of light openwork construction such as flexible woven wire fabric. The working strand of the conveyor traverses the tunnel, being supported therein through its length and breadth directly by the metallic floor of the tunnel, and the return strand of the conveyor returns beneath the tunnel to its receiving end.

The relatively small amount of metal employed in the construction of this conveyor, together with its openwork structure, insures a low heat capacity, a large heat-radiating surface area in comparison with its mass, maximum radiation through the openings in the conveyor, and minimum contact with the ware.

The flexibility of the conveyor permits it to conform to the flat bottom of the tunnel at all times under the weight of the ware and eliminates warping and buckling, thereby providing a good surface on which ware may be easily placed and carried without falling over and breaking.

In the accompanying drawing.

Figure 1:
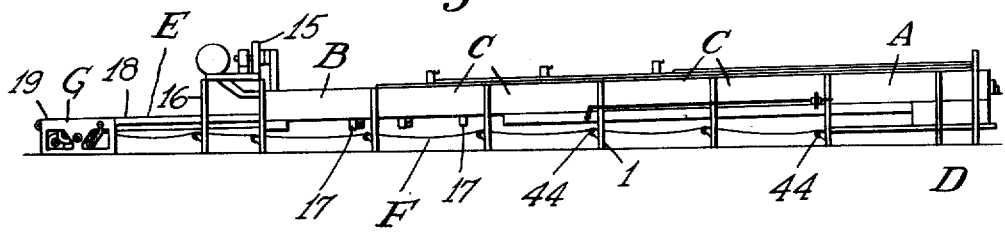
Figure 1 is a diagrammatic side view of a leer embodying the present invention.

Referring to the drawing, the leer which I have shown as being equipped with an open-work conveyor, according to my invention, briefly comprises, as diagrammatically illustrated in Fig. 1, an entrance or receiving section A; an exit or delivery section B; a plurality of intermediate sections C; a fire box D, located beneath the receiving section A; a delivery table E, located at the exit end of the tunnel; an endless conveyor belt F, of flexible open woven wire fabric, the ware-bearing strand of which traverses the tunnel and the table E, and the idle strand of which returns to the receiving or hot end of the tunnel beneath the leer; and a conveyor-driving mechanism G.

Figure 4:
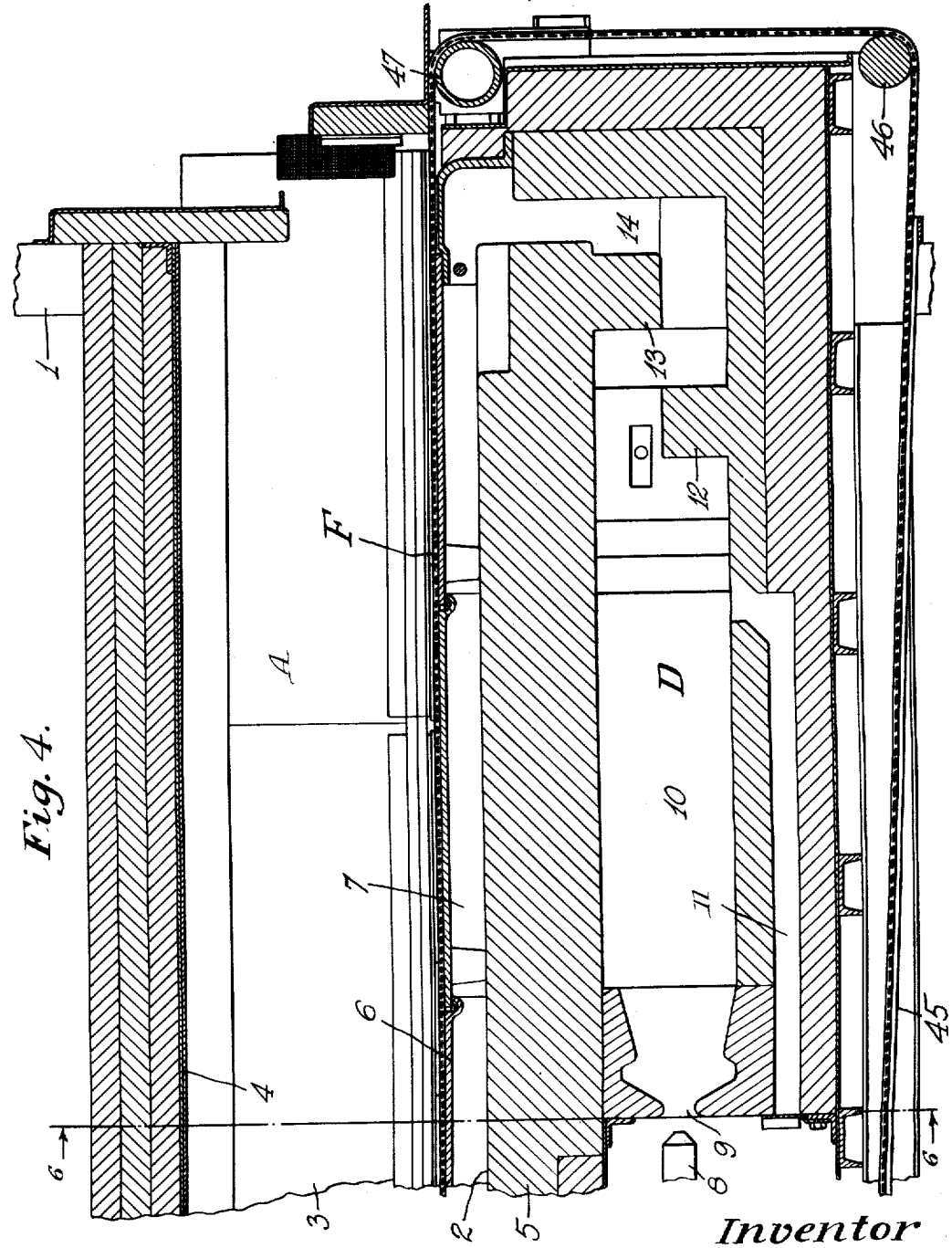
Fig. 4 is a vertical longitudinal section through the entrance or receiving end of the leer taken on the line 4—4 of Fig. 6.

The several sections of the leer are supported in end-to-end relation to form a tunnel, by suitable frame-work 1, and each comprises a bottom 2, side walls 3, and a top 4. The bottom 2 of the receiving section A, and of several of the succeeding intermediate sections C, may be, as shown in Fig. 4, constructed of refractory material 5, which supports a series of metallic members 6 in spaced relation thereto to form heating flues 7 extending longitudinally beneath the entire length of the tunnel.

The leer is heated by a burner 8 which projects a flame through an opening 9 into a combustion chamber 10 provided in the fire box D. As the products of combustion pass forwardly in the chamber 10 they are diluted, to lower their temperature, by air from the outer atmosphere, which is admitted through a damper-controlled duct 11 provided in the bottom of the chamber. As the products of combustion emerge from the chamber 10 they encounter baffles 12 and 13 around which they flow into a vertical flue 14 which communicates at its upper end with the flue 7. The products of combustion are drawn through the flue 7 by an exhaust fan 15 which is mounted on an overhead frame structure 16 located adjacent to the exit end of the tunnel, as shown diagrammatically in Fig. 1.

The temperature of the gases traversing the flue 7 may be controlled at will by admitting air from the outer atmosphere into these flues at intervals, through damper-controlled openings 17 provided in the bottom of the leer.

Figure 2:
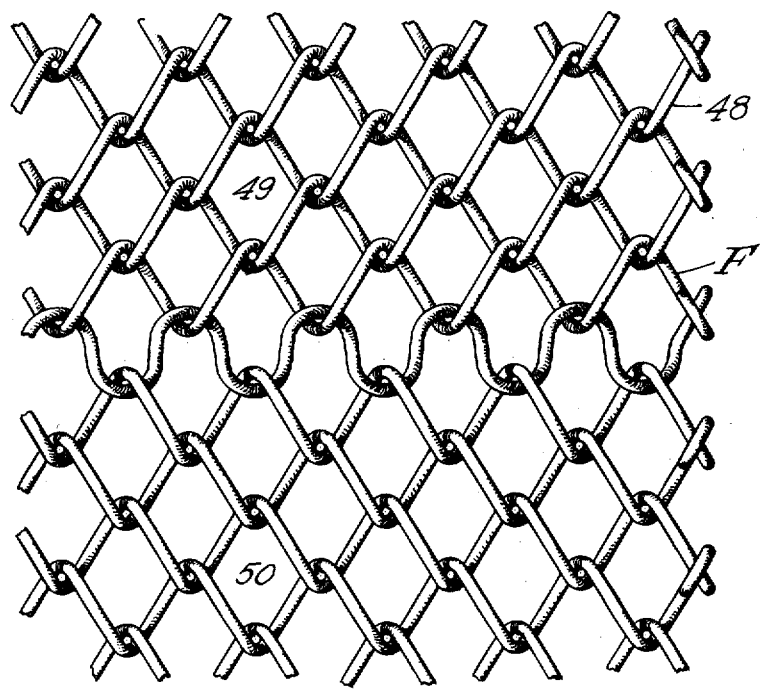
Fig. 2 is a fragmentary plan view illustrating one suitable form of conveyor belt of open woven wire construction.

According to my invention, as hereinbefore stated, the leer is equipped with an endless conveyor F of flexible open woven wire fabric (Fig. 2). The ware-bearing strand of this conveyor extends entirely through the tunnel and is supported therein, throughout its length and breadth, by the flat metallic members 6 which constitute the floor of the tunnel.

Inasmuch as the temperature of the floor of the tunnel throughout its length is substantially that of the heating flue 7, and in view of the fact that the temperature in this flue may be controlled at will by a proper adjustment of the damper-controlled openings 17, the temperature of the ware-bearing strand of the conveyor may be maintained at substantially the temperature of the tunnel during its travel therethrough, rather than at a lower temperature at the entrance end and at a higher temperature in the cooling zones of the tunnel, as has been the case in leers as heretofore constructed.

The receiving table E consists of a plurality of spaced parallel longitudinal bars or rails 18, only one of which is shown in side elevation in Fig. 1. These rails are supported at their forward ends by the frame of the section B of the leer and at their rear ends by a frame 19 of the belt driving mechanism G. This table provides a support for the conveyor as it emerges from the tunnel bearing the annealed ware and permits a free circulation of air through the conveyor, in order to cool the ware sufficiently to be handled.

Figure 5:
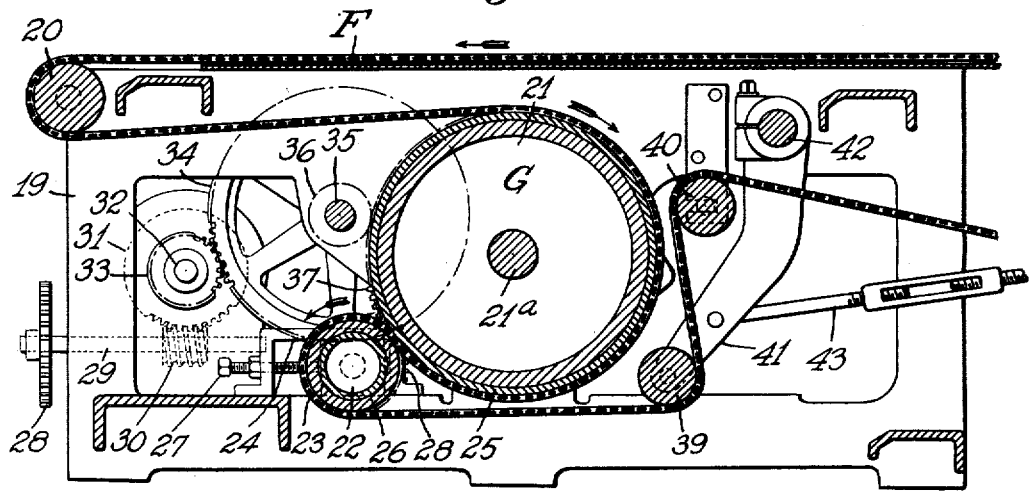
Fig. 5 is a vertical longitudinal section through the conveyor driving mechanism at the delivery end of the leer.
Figure 6:
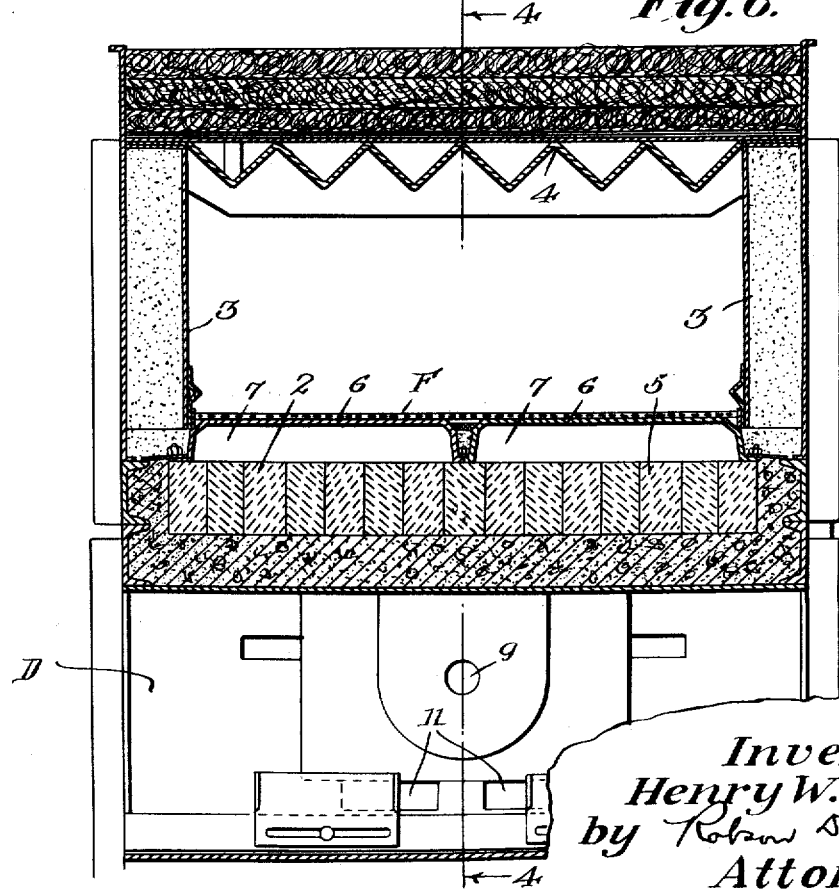
Fig. 6 is a vertical transverse sectional view through the leer taken on the line 6—6 of Fig. 4.

As best shown in Fig. 5, the conveyor, as it advances over the end of the receiving table E, passes over a roller 20 journalled in the frame 19, and thence forwardly and around a driving drum 21 which is mounted on a shaft 21ª journaled in the frame 19. At the point where the conveyor leaves the drum 21, it passes over and rearwardly around a roller 22 which is journaled at its ends in slide blocks 23, mounted in ways 24. The drum 21 and the roller 22 are provided with resilient and anti-slipping coverings 25 and 26 respectively, composed of rubber or the like, so as to present a tractive surface to the conveyor and insure a positive driving contact therewith. The roller 22 is maintained in gripping contact with the conveyor F by jack screws 27 which are threaded into the ways 24 and which bear against the slide blocks 23.

The drum 21 and the roller 22 are rotated by a sprocket wheel 28, which is driven in any preferred manner. The sprocket wheel 28 is mounted on a shaft 29 which carries a worm 30 meshing with a worm wheel 31 carried by a shaft 32. A pinion 33 is also keyed to the shaft 32 and meshes with a gear wheel 34 mounted on a shaft 35. A pinion 36 is also keyed to the shaft 35 and meshes with a gear wheel 37 carried by the drum 21. The gear wheel 37 meshes with a gear wheel 38 on the roller 22 whereby both drum and roller are driven at the same peripheral speed.

The conveyor F, after passing around the roller 22 passes forwardly and around an idle roller 39 and thence upwardly and over a roller 40 carried by the frame 19. The idle roller 39 is carried by arms 41 which are pivotally connected to a shaft 42 carried by the frame 19, and may be adjusted to take up any slack in the conveyor F, by means of adjustable rods 43.

After leaving the roller 40, the belt F passes forwardly beneath the leer and is supported at intervals by rollers 44 which are mounted on the frames of the several sections of the leer. At the forward or receiving end of the leer, the lower strand of the belt F is supported, as shown in Fig. 4, by a guideway or track 45 disposed beneath the fire box D. As the belt leaves this track, it passes around a roller 46 and upwardly parallel to the front end of the fire box and thence over a roller 47 and into the front end of the leer tunnel.

Figure 3:
Fig. 3 is a diagrammatic view showing a conveyor belt composed of alternate right and left hand woven sections.

The fabric of the conveyor F is preferably constructed of interconnected wires 48, of approximately helical form, as best shown in Fig. 2. The adjacent helixes in such construction, however, form a fabric having a diagonally ribbed surface, which causes a marked tendency for the conveyor to creep laterally through contact between the conveyor and the rollers or other support. This difficulty is avoided by constructing the conveyor of alternate sections 49 and 50 which are respectively woven from right and left-hand helixes (Fig. 3). By so doing, the tendency for one section to creep in one direction is opposed by the tendency of the adjacent section to creep in an opposite direction.

While I have shown the present conveyor as being constructed of a woven fabric composed of interconnected helixes, it will be obvious that the advantages of a light weight flexible conveyor of open structure may be obtained through the use of a different construction from that described.

The particular embodiment of the invention illustrated and described, has been selected by way of example only, and it is to be understood that various modifications may be employed in the fulfilling of the spirit of the invention as defined in the appended claims.

I claim:

1. A glass annealing leer comprising a tunnel having a heated floor, and an endless carrier having one side of its ware-bearing strand in direct contact with said floor and the other side thereof in direct contact with the ware.

2. A glass annealing leer comprising a tunnel, means for heating said tunnel from beneath, and an endless ware-conveyor of mesh fabric having its ware-bearing strand extending through the lower part of said tunnel and always parallel to the bottom thereof, the said conveyor having its idle or return strand disposed beneath said tunnel and beneath the said heating means.

3. A glass-annealing leer comprising a tunnel, a heating flue extending longitudinally beneath the same, the upper wall of said flue constituting the bottom wall of said tunnel, and an endless belt of reticulated woven wire structure having the portion thereof that is within said tunnel supported entirely by the bottom of said tunnel, and heated by direct contact therewith, for conveying glassware through said tunnel in spaced relation with respect to the bottom portion thereof, to permit of free circulation of convection currents between the bottom of the ware and the bottom of said tunnel.

4. A glass-annealing leer comprising a tunnel, a heating flue extending longitudinally beneath the same, the upper wall of said flue constituting the bottom wall of said tunnel, and an endless belt of reticulated woven wire fabric extending entirely through said tunnel, the portion of said belt disposed within said tunnel being supported throughout its length and breadth by the bottom of said tunnel, said belt being flexible, both in longitudinal and lateral directions, to conform to the contour of the bottom of said tunnel, and being adapted to convey glassware through the tunnel in spaced relation with respect to the bottom thereof.

5. A glass-annealing leer comprising a tunnel, an endless carrier extending longitudinally therethrough, said carrier being of flexible woven wire construction and having symmetrical upper and lower surfaces, and a drum for driving said carrier arranged to have driving contact with the ware supporting surface of said carrier.

6. A glass-annealing leer comprising a tunnel provided with a flat metallic bottom, and an endless conveyor of woven wire fabric having its ware-bearing strand extending through said tunnel and supported therein throughout its length and breadth directly by the flat bottom of said tunnel.

7. A glass-annealing leer comprising a tunnel provided with a flat bottom, and an endless conveyor of flexible reticulated structure having its ware-bearing strand extending through said tunnel and supported therein throughout its length and breadth directly by the flat bottom of said tunnel.

8. A glass-annealing leer comprising a tunnel provided with a flat bottom, and an endless conveyor of reticulated woven wire structure having its ware-bearing strand extending through said channel and supported therein throughout its length and breadth directly by the flat bottom of said tunnel.

9. A glass-annealing leer comprising a tunnel provided with a flat bottom, and an endless conveyor constructed of spiral links loosely interconnected for independent horizontal movement under the action of heat, said conveyor having its ware-bearing strand extending through said tunnel and supported therein throughout its length and breadth directly by the flat bottom of said tunnel.

10. A glass-annealing leer comprising a tunnel having a metallic bottom and having a flue extending beneath said bottom for the passage of a temperature-controlling medium, and an endless conveyor having its ware bearing strand extending through said tunnel and supported therein throughout its length and breadth directly by said metallic bottom.

11. A glass-annealing leer comprising a tunnel having a metallic bottom and having a flue extending beneath said bottom for the passage of a temperature-controlling medium, and an endless conveyor of flexible woven wire fabric, having its ware-bearing strand extending through said tunnel and supported therein throughout its length and breadth directly by said metallic bottom.

12. A glass-annealing leer comprising a tunnel having a metallic bottom and having a flue extending beneath said bottom for the passage of a temperature-controlling medium, and an endless conveyor of reticulated woven wire structure having its ware-bearing strand extending through said tunnel, and supported therein throughout its length and breadth directly by said metallic bottom.

13. A glass-annealing leer comprising a tunnel having a metallic bottom and having a flue extending beneath said bottom, for the passage of a temperature-controlling medium, means for causing a flow of products of combustion through said flue, and an endless conveyor having its ware-bearing strand extending through said tunnel and supported therein throughout its length and breadth directly by said metallic bottom.

Signed at Hartford, Connecticut, this 28th day of March, 1925.

HENRY W. INGLE.

tunnel provided with a flat bottom, and an endless conveyor constructed of spiral links loosely interconnected for independent horizontal movement under the action of heat, said conveyor having its ware-bearing strand extending through said tunnel and supported therein throughout its length and breadth directly by the flat bottom of said tunnel.

10. A glass-annealing leer comprising a tunnel having a metallic bottom and having a flue extending beneath said bottom for the passage of a temperature-controlling medium, and an endless conveyor having its ware bearing strand extending through said tunnel and supported therein throughout its length and breadth directly by said metallic bottom.

11. A glass-annealing leer comprising a tunnel having a metallic bottom and having a flue extending beneath said bottom for the passage of a temperature-controlling medium, and an endless conveyor of flexible woven wire fabric, having its ware-bearing strand extending through said tunnel and supported therein throughout its length and breadth directly by said metallic bottom.

12. A glass-annealing leer comprising a tunnel having a metallic bottom and having a flue extending beneath said bottom for the passage of a temperature-controlling medium, and an endless conveyor of reticulated woven wire structure having its ware-bearing strand extending through said tunnel, and supported therein throughout its length and breadth directly by said metallic bottom.

13. A glass-annealing leer comprising a tunnel having a metallic bottom and having a flue extending beneath said bottom, for the passage of a temperature-controlling medium, means for causing a flow of products of combustion through said flue, and an endless conveyor having its ware-bearing strand extending through said tunnel and supported therein throughout its length and breadth directly by said metallic bottom.

Signed at Hartford, Connecticut, this 28th day of March, 1925.

HENRY W. INGLE.

Certificate of Correction.

It is hereby certified that in Letters Patent No. 1,583,046, granted May 4, 1926, upon the application of Henry W. Ingle, of Hartford, Connecticut, for an improvement in "Leers for Annealing Glassware," errors appear in the printed specification requiring correction as follows: Page 1, line 21, after the word "great" strike out the comma and insert a period and for the word "therefore" read *Therefore;* same page, line 48, before the word "to" insert the word *is;* page 3, line 127, claim 8, for the word "channel" read *tunnel;* and that the said Letters Patent should be read with these corrections therein that the same may conform to the record of the case in the Patent Office.

Signed and sealed this 22d day of June, A. D. 1926.

[SEAL.]

M. J. MOORE,
*Acting Commissioner of Patents.*

Certificate of Correction.

It is hereby certified that in Letters Patent No. 1,583,046, granted May 4, 1926, upon the application of Henry W. Ingle, of Hartford, Connecticut, for an improvement in "Leers for Annealing Glassware," errors appear in the printed specification requiring correction as follows: Page 1, line 21, after the word "great" strike out the comma and insert a period and for the word "therefore" read *Therefore;* same page, line 48, before the word "to" insert the word *is;* page 3, line 127, claim 8, for the word "channel" read *tunnel;* and that the said Letters Patent should be read with these corrections therein that the same may conform to the record of the case in the Patent Office.

Signed and sealed this 22d day of June, A. D. 1926.

[SEAL.]
M. J. MOORE,
*Acting Commissioner of Patents.*